E. J. SCHWAB.
NUT LOCK.
APPLICATION FILED NOV. 7, 1919.
1,358,586.
Patented Nov. 9, 1920.
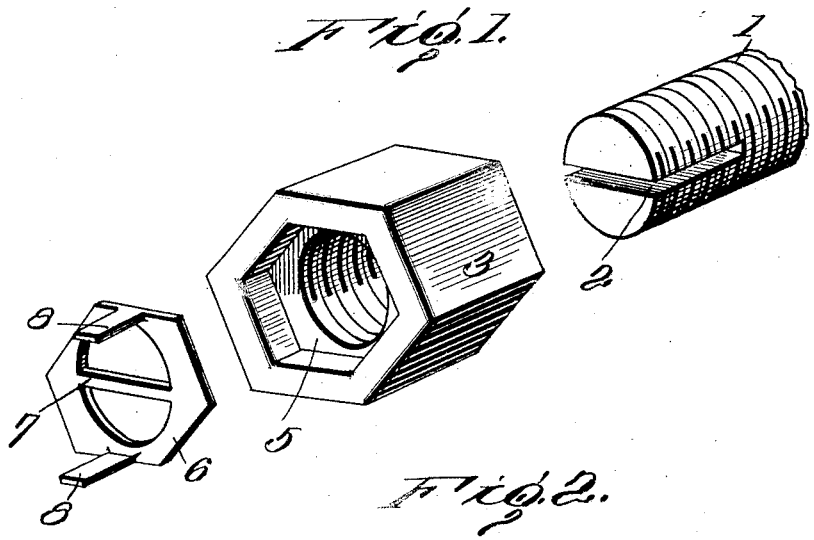
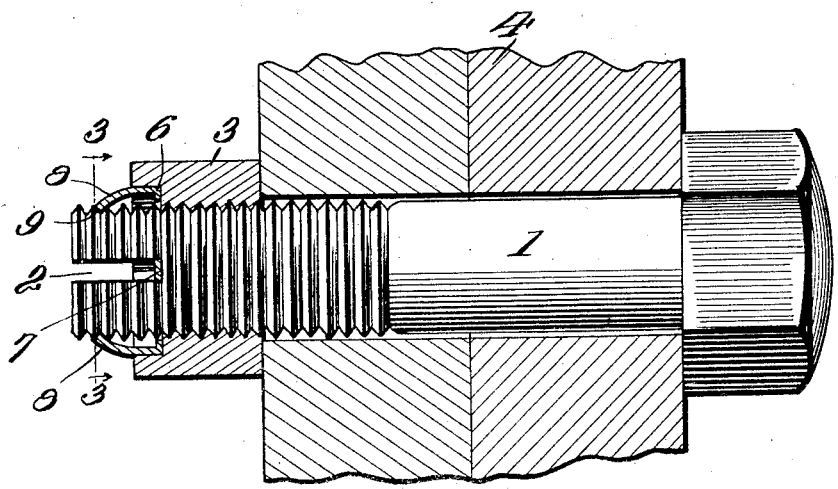
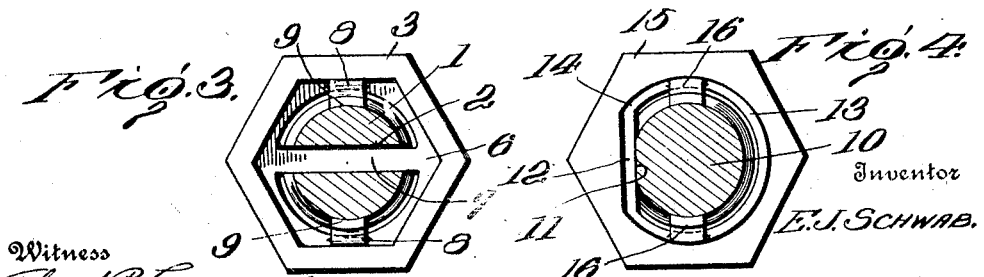
Witness
Floyd R. Cornwall
Inventor
E. J. Schwab.
By
Attorney

UNITED STATES PATENT OFFICE.

EDWIN J. SCHWAB, OF SANDUSKY, OHIO.

NUT-LOCK.

1,358,586.  Specification of Letters Patent.  Patented Nov. 9, 1920.

Application filed November 7, 1919. Serial No. 336,335.

*To all whom it may concern:*

Be it known that I, EDWIN J. SCHWAB, a citizen of the United States, residing at Sandusky, in the county of Erie and State of Ohio, have invented certain new and useful Improvements in Nut-Locks, of which the following is a specification, reference being had therein to the accompanying drawing.

This invention relates to certain new and useful improvements in nut locks, the object of the invention being to provide a nut lock which is exceedingly simple and cheap in construction and one which can be readily placed in position so that the nut and bolt will be coupled together.

Another and further object of the invention is to provide novel means for holding the coupling washer in position within the nut so as to prevent the same from being displaced.

A still further object of the invention is to provide a nut lock in which the nut has a recess to receive a washer which is provided with means for connecting the same to the bolt so as to prevent the nut from turning, said washer having malleable tongues which are adapted to bend into engagement with the threads of the nut for preventing the washer from moving out of the recess of the nut.

Other and further objects and advantages of the invention will be hereinafter set forth and the novel features thereof defined by the appended claims.

In the drawings:—

Figure 1 is a perspective view of a nut lock constructed in accordance with my invention showing the members of the same separated.

Fig. 2 is a longitudinal section partly in elevation showing the nut lock in position upon a bolt arranged in a pair of members.

Fig. 3 is a section taken on line 3—3 of Fig. 2; and

Fig. 4 is a slightly modified form of a nut lock.

In carrying out my invention according with the construction of the nut lock illustrated in Figs. 1, 2 and 3 I employ a bolt 1 which is provided with a bifurcated end 2 on which is adapted to be arranged a nut 3 for securing the bolt in position within the members to be secured as shown at 4. One end of the nut is provided with a recess 5 herein shown hexagonal in shape into which is adapted to be seated a hexagonal washer 6 after the nut has been screwed tight against the member to be secured, said washer having a cross bar 7 fitting in the bifurcated portion of the bolt. In constructing the bolt I preferably form a saw cut through the end to produce a slot to receive the cross bar of the washer 6 so that the nut and bolt will be then coupled together.

In order to provide means for securing the washer 6 within the recess of the nut after it has been placed in position I form the washer with malleable tongues 8 which are adapted to be bent into engagement with the threads of the bolt as clearly shown at 9, the free ends of the tongues extending between the threads of the bolt so as to securely hold the same in position.

In the modification shown in Fig. 4 instead of employing a bifurcated bolt I employ a bolt 10 having a flat portion 11 along its side which is adapted to be engaged by the flat portion 12 of a washer 13 which is seated in the recess 14 formed in the nut 15, said recess having a shape corresponding to the shape of the washer whereby the washer will be prevented from turning after it has been inserted. The washer 12 is provided with malleable tongues 16 which are bended into engagement with the threads of the nut in the same manner shown in the preferred form in order to hold the washer in position within the recess of the nut.

While I have shown certain details of construction I do not wish to limit myself to these details as I am aware that the washer and bolt can be constructed in various ways for coupling the nut to the bolt without departing from the spirit of my invention as the recess of the nut can be formed of any shape desired so long as the washer corresponds in shape thereto and is provided with means for engaging the bolt for preventing the nut from turning after the washer has been inserted.

From the foregoing description it will be seen that I have provided a nut lock in the form of a washer seated in a correspondingly shaped recess of a nut having means for coupling the nut to the bolt, said washer having malleable tongues engaging the thread of the bolt for holding the washer in position within the nut.

What I claim is:—

1. In a nut lock the combination with a bolt, of a nut mounted thereon having a recess and a washer arranged within said recess having means for engaging the bolt for preventing the nut from turning and malleable tongues carried by the washer engaging the threads of the bolt for preventing the washer from being displaced.

2. In a nut lock the combination with a bolt, of a nut mounted thereon having a recess, a washer arranged within said recess and corresponding in shape thereto, means carried by said washer for engaging the bolt for preventing the nut from turning and means carried by said washer engaging the bolt for holding the washer within the recess of the nut.

3. In a nut lock the combination with a bolt having a bifurcated end, of a nut mounted on said bolt having a recess, a washer arranged within said recess corresponding in shape thereto, said washer having a cross bar extending into the bifurcation of said nut and malleable tongues carried by said washer adapted to be bent into engagement with the threads of the bolt for holding said washer within the recess of said nut.

4. In a nut lock the combination with a bolt, of a nut mounted on said bolt, a nonrotatable washer detachably mounted upon said nut, means carried by said washer for engaging the bolt for preventing the nut from turning and means carried by the washer engaging the bolt for holding the washer in position upon said nut.

In testimony whereof I hereunto affix my signature in the presence of two witnesses.

EDWIN J. SCHWAB.

Witnesses:
DANIEL SCHWAB,
FRED WOLFF.